United States Patent [19]
Fauchon et al.

[11] Patent Number: 5,727,794
[45] Date of Patent: Mar. 17, 1998

[54] LIP SEAL ASSEMBLY

[75] Inventors: Claude Fauchon; Roberto Fabro, both of Turin; Helmut Wittich, Kutzenhausen/Agawang, all of Italy

[73] Assignee: Forsheda AB, Sweden

[21] Appl. No.: 661,398

[22] Filed: Jun. 7, 1996

[30] Foreign Application Priority Data

Jun. 9, 1995 [IT] Italy .................. TO95A0479

[51] Int. Cl.[6] ............................................ F16J 15/32
[52] U.S. Cl. ........................... 277/152; 277/37; 277/44; 277/63; 277/153; 277/178; 277/183; 277/193
[58] Field of Search ......................... 277/37, 44, 63, 277/152, 153, 178, 183, 193

[56] References Cited

U.S. PATENT DOCUMENTS

| | | | |
|---|---|---|---|
| 2,167,603 | 7/1939 | Victor | 277/63 |
| 2,185,790 | 1/1940 | Kosatka et al. | 277/63 |
| 3,575,426 | 4/1971 | Durham | 277/153 |
| 3,940,155 | 2/1976 | Baulme | 277/183 |
| 5,199,718 | 4/1993 | Niemiec | 277/58 |
| 5,513,858 | 5/1996 | Deely et al. | 277/193 |

*Primary Examiner*—William A. Cuchlinski, Jr.
*Assistant Examiner*—Christina Annick
*Attorney, Agent, or Firm*—Baker & Daniels

[57] ABSTRACT

A seal assembly (1) wherein two sealing rings (2) of the same shape and size are connected integral with each other, coaxially with a common axis (3), and in a position wherein they are rotated in relation to each other about the common axis (3); the sealing rings (2) presenting respective sealing lips (8) defining an annular cavity (25), and being so spaced as to define a passage (26) connecting the annular cavity (25) to the outside.

21 Claims, 2 Drawing Sheets

LIP SEAL ASSEMBLY

The present invention relates to a lip seal assembly.

More specifically, the present invention relates to a seal assembly which may be applied to advantage to any fluid device requiring the separation of two chambers containing different respective fluids and fitted through with the same rotary shaft.

As is known, in fluid devices of the above type, it is essential to prevent the fluid in one chamber from leaking and mixing with the fluid in the other, and also to provide for external drainage of any fluid leaking from one or both of the chambers.

To do this, various solutions are currently adopted. In particular, a double-lip sealing ring is used, wherein the rotary shaft is enclosed inside two opposed, integral sealing lips, one for each chamber.

Though widely used, known sealing rings of the above type are difficult to produce, owing to the presence of undercuts requiring particular manufacturing steps and relatively complex, high-cost equipment.

Moreover, the arrangement of the sealing lips and, in general, the overall shape of known rings of the above type make it extremely difficult, if not impossible, to form external passages by which to continuously drain off any leakage through the sealing lips.

The above drawbacks are currently overcome using an assembly comprising two separate, adjacent single-lip sealing rings, one for each chamber. Though relatively easy to produce, by virtue of the two rings being made separately, and while simplifying the formation of external drain-off passages, such assemblies involve a good deal of time and difficulty to fit, mainly due to the two rings having to be fitted in precise positions, and more specifically at a precise distance, in relation to each other and within very strict tolerances.

It is an object of the present invention to provide a seal assembly designed to overcome the aforementioned drawbacks, and which, in particular, is easy and cheap to produce and provides for fast, troublefree fitment.

According to the present invention, there is provided a lip seal assembly which is interposed between two cavities containing different fluids, and comprises two sealing rings presenting respective annular lips; characterized by comprising mutual positioning means interposed between said sealing rings and for positioning the sealing rings in fixed positions in relation to each other; and connecting means for connecting said sealing rings to each other.

Said mutual positioning means of the above assembly preferably comprise centering means for positioning said lips coaxially with a common axis; and spacing means for maintaining said rings at a given distance from each other along said common axis.

Also, said sealing rings of the above assembly are preferably identical.

A non-limiting embodiment of the present invention will be described by way of example with reference to the accompanying drawings, in which.

Figure 2:
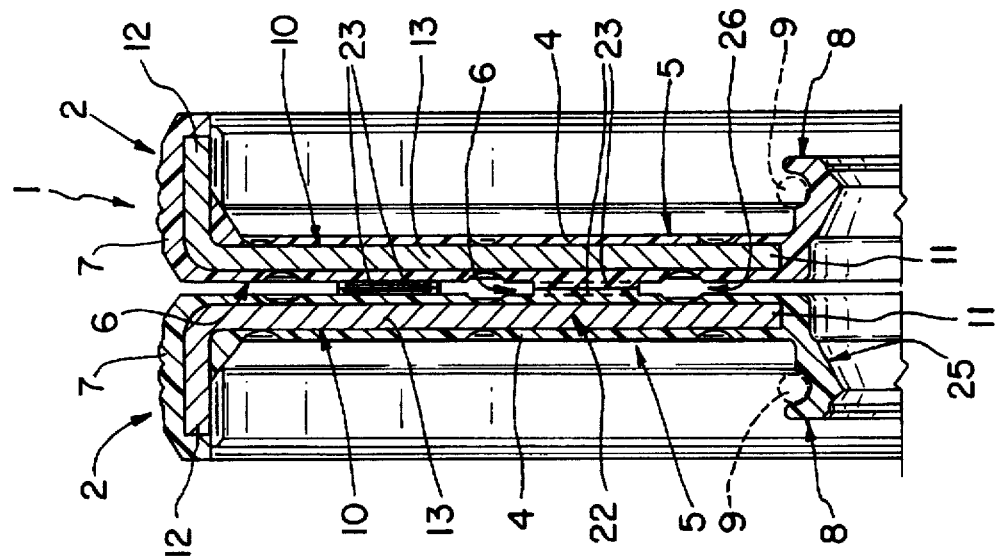
FIG. 2 shows a larger-scale section along line II—II in FIG. 1.

Number 1 in the accompanying drawings indicates a lip seal assembly for fitment to a rotary shaft (not shown) and for separating two chambers (not shown) containing respective fluids and both fitted through with said rotary shaft.

Assembly 1 comprises two adjacent sealing rings 2 of the same shape and size and presenting respective axes 3 coincident with each other.

Each ring 2 is formed separately from the other, preferably by curing, and comprises an intermediate plate portion 4 defined by two flat annular face surfaces 5, 6 parallel to each other; and an outer annular portion 7 projecting from surface 5, coaxially with axis 3, and from an outer peripheral edge of plate portion 4.

Each ring 2 also comprises an annular sealing lip 8 of known shape, which extends, coaxially with axis 3, from an inner peripheral edge of plate portion 4 and on the same side as and entirely inside portion 7.

Each lip 8 presents an inner annular sealing portion which, in use, cooperates in sliding manner with the outer lateral surface of the rotary shaft (not shown), and, in use, is forced into contact with the rotary shaft (not shown) by a known annular spring 9 housed inside a circumferential seat formed on the outside of lip 8 and open towards portion 7.

Each ring 2 is made of any known elastomeric material inside which is fully embedded a metal reinforcing structure 10. In the example shown, reinforcing structure 10 comprises an inner annular portion 11 surrounding lip 8; an outer annular portion 12 extending inside a peripheral annular portion of plate portion 4 and inside portion 7; and a number of radial portions 13 (only one shown in FIG. 2) equally spaced angularly and integral with annular portions 11 and 12.

Figure 3:
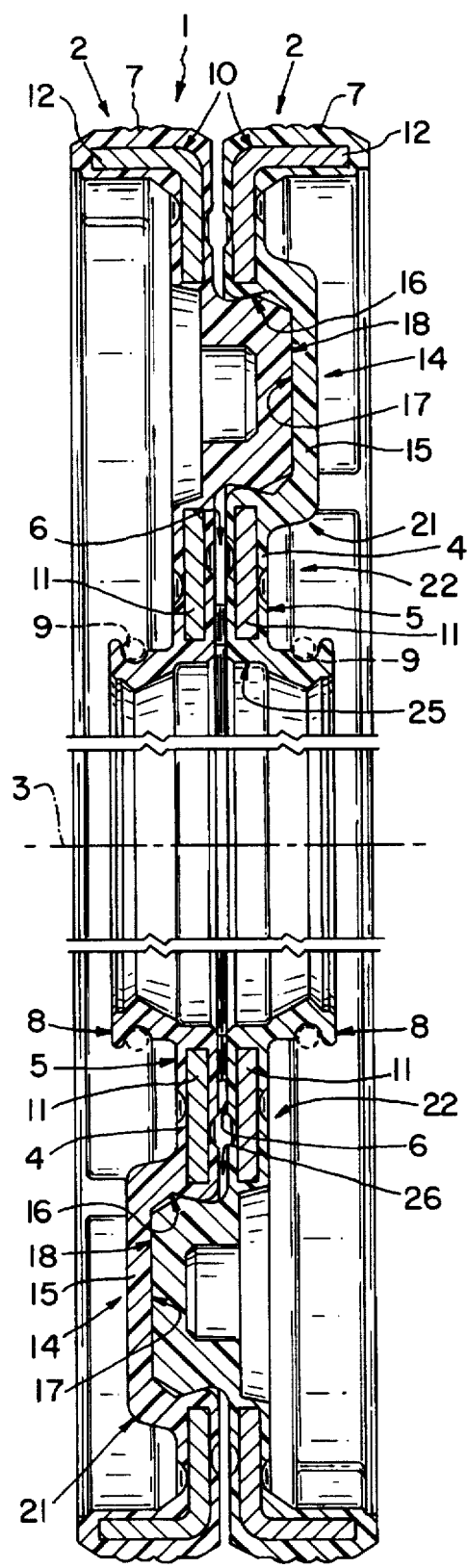
FIG. 3 shows a larger-scale section along line III—III in FIG. 1.
Figure 4:
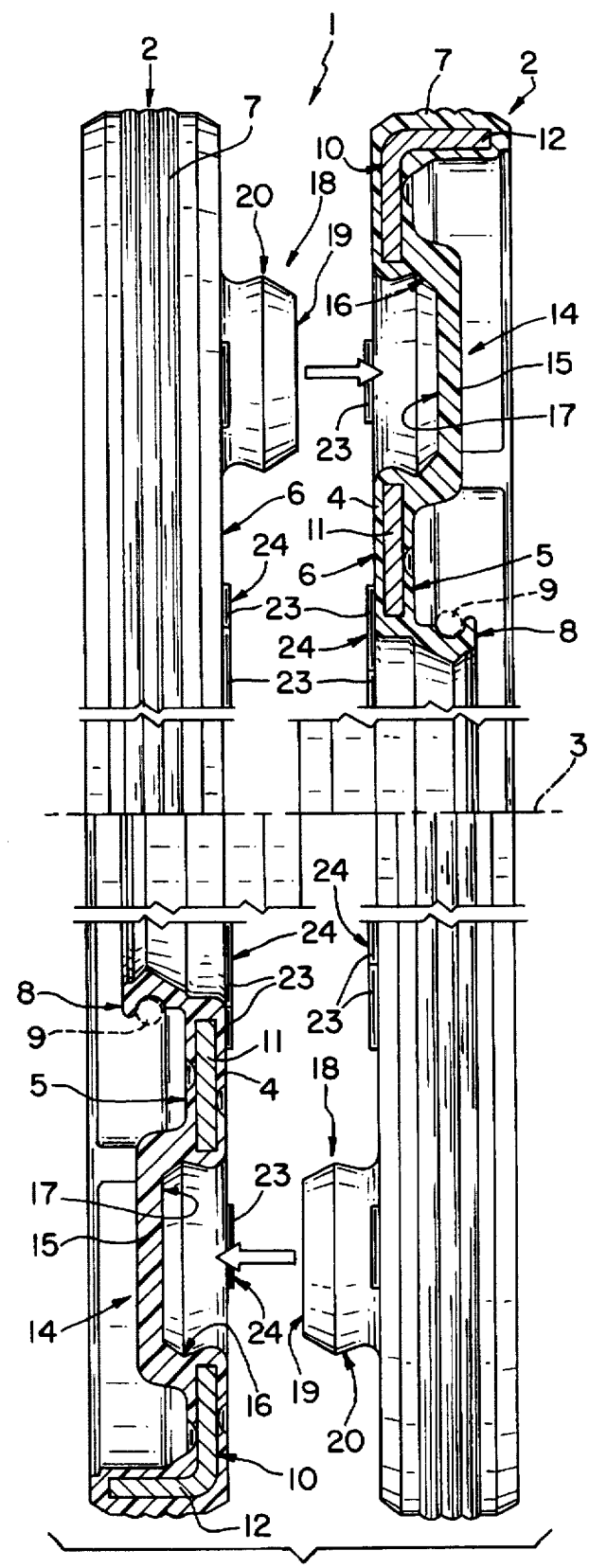
FIG. 4 shows a breakdown view of the component parts of the FIG. 3 seal assembly.

With reference to FIGS. 3 and 4, in the non-reinforced portions of each ring 2, plate portion 4 comprises two recesses 14 formed solely of elastomeric material and extending in diametrically-opposite positions in the space between lip 8 and portion 7. More specifically, each recess 14 comprises a flat bottom wall 15 substantially parallel to plate portion 4, is defined internally by a shaped surface 16, and defines a respective seat 17.

Again in the non-reinforced portions of each ring 2, plate portion 4 also comprises two hollow projections 18 also made of elastomeric material and extending from surface 6 on the opposite side of plate portion 4 in relation to recesses 14. Each projection 18 of each ring 2 is formed between respective recesses 14, snaps inside a respective seat 17 on the other ring 2, and is defined at the front by a flat surface 19 contacting respective wall 15, and laterally by a surface 20 complementary to respective surface 16 (FIG. 4).

When projections 18 are engaged inside respective seats 17, rings 2 are rotated in relation to each other and about axes 3 by a given angle equal to the angle between each projection 18 and the adjacent seat 17, and which, in the example shown, is substantially equal to 90°.

Figure 1:
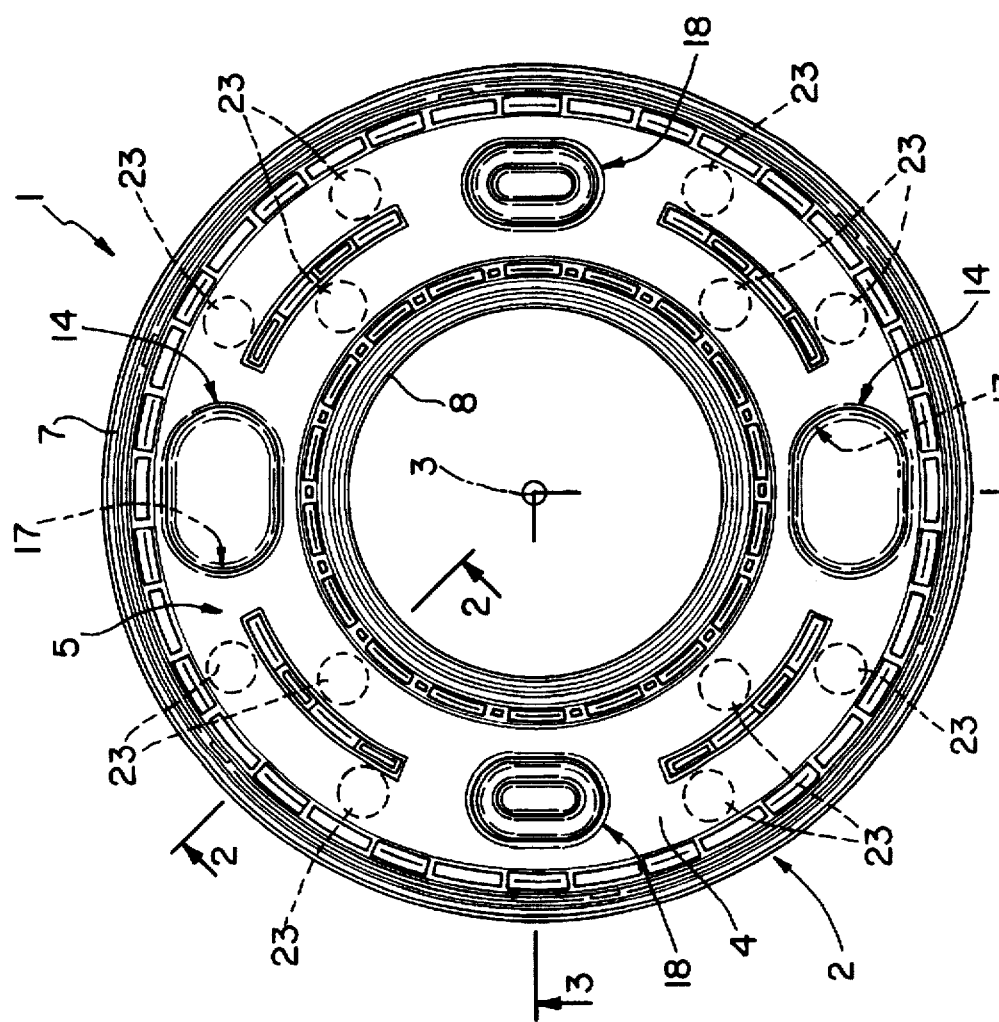
FIG. 1 shows a front view of a preferred embodiment of the seal assembly according to the present invention.

Projections 18 and recesses 14 define a device 21 for releasably snap-on connecting rings 2 (FIG. 3), and at the same time part of a device 22 for positioning rings 2 in relation to each other. For each ring 2, positioning device 22 also comprises a number of axial spacers 23 made of elastomeric material and distributed on respective surface 6, preferably in the portions of plate portion 4 between projections 18 and respective seats 17 (FIG. 1). More specifically, spacers 23 of each ring 2 project from surface 6 on the same side as projections 18, and each present a flat face surface 24 which, when projections 18 are engaged inside respective seats 17, contacts the face surface 24 of a corresponding spacer 23 on the other ring 2 (FIG. 2).

To prevent sudden in-service disconnection of the two rings 2, the face surfaces 24 of spacers 23 are connected integral with each other, and more specifically are welded, preferably co-cured, to each other.

The co-curing treatment is performed by subjecting rings 2—formed separately beforehand and in a stable, perfectly manipulable condition—to a timed heating process, which provides for finish curing the elastomeric material and forming bonds between surfaces 24 with no need for compressing surfaces 24 against each other.

When the face surfaces 24 of spacers 23 are positioned contacting each other, lips 8 define an annular cavity 25 which, in use, is closed internally by the outer surface of the rotary shaft (not shown), and the plate portions 4 of the two rings 2 define a passage 26 (FIGS. 2 and 3) communicating on one side with cavity 25 and on the other side with the outside atmosphere, and which in turn defines, in use, an escape for any leakage inside cavity 25.

The advantages of seal assembly 1 will be clear from the foregoing description.

In particular, while presenting the same performance characteristics, and more specifically the same efficiency and reliability, as known double-lip sealing rings, assembly 1 presents the added advantage of being easy to produce and requiring no special tooling. In fact, the two rings 2 of assembly 1 are formed separately and then connected, thus eliminating the manufacturing problems posed by the undercuts of known double-lip sealing rings.

As compared with known double-lip sealing rings, assembly 1 also presents the further advantage of comprising a permanent passage 26 connecting the gap between the two lips 8 with the outside atmosphere, and hence a permanently open escape route for any in-service leakage through lips 8. In addition to external drainage, passage 26 also provides for permanently connecting the "air" sides of lips 8 with the outside atmosphere, which, as is known, greatly improves the performance of lips 8 and, more specifically, provides for efficient operation of any hydrodynamic devices (not shown) on lips 8.

As compared with solutions comprising two separate sealing rings, assembly 1 also provides for much faster fitment and for eliminating any problems caused by mispositioning of the rings. In particular, projections 18 and seats 17 provide for positioning the respective axes 3 of rings 2 perfectly coaxial with each other, and spacers 23 provide for positioning rings 2 and hence lips 8 at a given distance from each other.

Snap-on connecting device 21 provides for easily connecting and maintaining rings 2 in a given reference position, at least until they are co-cured to weld them together permanently in a given mutual position.

Welding the two rings 2 also provides for eliminating bonding materials and ensuring permanent connection in any working conditions.

Using two identical sealing rings which may be made from the same mold, and the straightforward manner in which rings 2 are connected, provide for greatly reducing manufacturing cost as compared with known solutions.

The fact that rings 2 are identical, and the manner in which they are connected, provide for forming a substantially symmetrical seal assembly, which further simplifies fitment by enabling assembly 1 to be fitted freely either way and regardless of the rotation direction of the shaft (not shown).

Finally, the presence of openings formed through the metal reinforcing structure enables the use of extractors, the gripping members of which positively engage the openings.

Clearly, changes may be made to seal assembly 1 as described and illustrated herein without, however, departing from the scope of the present invention.

More specifically, rings 2 may differ in shape from those described, may be made of materials other than those described, and may, for example, comprise nonmetal reinforcing structures partly or fully embedded in the elastomeric material, and sealing lips shaped differently from those described, to provide, for example, for greater sealing performance.

In addition, devices 22 for positioning rings 2 in relation to each other may be replaced by other devices; and rings 2 may be simply snap-on connected to each other, or simply welded to each other, or connected via the interposition of various materials presenting adhesive properties or at any rate such as to ensure permanent connection of rings 2 in any working conditions.

We claim:

1. A lip seal assembly for interposing between two cavities containing different fluids, said lip seal assembly comprising two sealing rings having respective annular lips; mutual positioning means disposed on said sealing rings and coaxially positioning the sealing rings in fixed positions relative to each other; a plurality of connecting means for releasably connecting said sealing rings to each other, said plurality of connecting means being spaced about the circumference of said two sealing rings: said sealing rings each having a respective reinforcing structure disposed in a first portion of said sealing rings, said connecting means disposed in a second, unreinforced portion of said sealing rings; and a permanent connection means permanently securing said sealing rings together.

2. An assembly as claimed in claim 1 further comprising spacing means for maintaining said sealing rings at a given distance from each other along a common axis.

3. A lip seal assembly which is interposed between two cavities containing different fluids, and comprises two sealing rings presenting respective annular lips; characterized by comprising mutual positioning means interposed between said sealing rings and for positioning the sealing rings in fixed positions in relation to each other, said mutual positioning means comprising centering means for positioning said annular lips coaxially with a common axis: connecting means for connecting said sealing rings to each other; and spacing means for maintaining said sealing rings at a given distance from each other along said common axis; for each said sealing ring, said spacing means comprise a number of spacers; each spacer of one of said sealing rings being positioned to contact a corresponding spacer of the other of said sealing rings.

4. An assembly as claimed in claim 2, characterized in that said sealing rings are connected to each other in a position wherein they are rotated in relation to each other about said common axis.

5. An assembly as claimed in claim 1, characterized in that said sealing rings are identical.

6. An assembly as claimed in claim 1, characterized in that said annular lips define an annular cavity, and in that said assembly comprises a passage connecting said annular cavity to the outside.

7. An assembly as claimed in claim 1, characterized in that said connecting means comprise snap-on connecting means.

8. An assembly as claimed in claim 7, characterized in that said connecting means comprise, for each said sealing ring, at least a pair of retaining seats and at least a pair of projections; the projections of one of said sealing rings snapping inside respective retaining seats formed on the other of said sealing rings.

9. An assembly as claimed in claim 8, characterized in that the projections and the retaining seats of each said sealing ring have mutually engageable complementary surfaces whereby axial separation of said sealing rings is inhibited by engagement of said complementary surfaces.

10. A lip seal assembly which is interposed between two cavities containing different fluids, and comprises two sealing rings presenting respective annular lips; characterized by comprising mutual positioning means interposed between said sealing rings and for positioning the sealing rings in fixed positions in relation to each other; connecting means for connecting said sealing rings to each other, said connecting means comprising snap-on connecting means which comprise, for each said sealing ring, at least a pair of retaining seats and at least a pair of projections; the projections of one of said sealing rings snapping inside respective retaining seats formed on the other of said sealing rings; and wherein each said sealing ring comprises a reinforcing structure; said retaining seats and said projections being formed in respective portions of the sealing rings having no said reinforcing structure.

11. An assembly as claimed in claim 1, characterized in that said permanent connecting means comprises at least one weld for stably connecting said sealing rings to each other.

12. An assembly as claimed in claim 3, characterized in that said sealing rings are connected to each other in a position wherein they are rotated in relation to each other about said common axis.

13. An assembly as claimed in claim 2, characterized in that said sealing rings are identical.

14. An assembly as claimed in claim 3, characterized in that said sealing rings are identical.

15. An assembly as claimed in claim 4, characterized in that said sealing rings are identical.

16. An assembly as claimed in claim 2, characterized in that said annular lips define an annular cavity, and in that said assembly comprises a passage connecting said annular cavity to the outside.

17. An assembly as claimed in claim 3, characterized in that said annular lips define an annular cavity, and in that said assembly comprises a passage connecting said annular cavity to the outside.

18. An assembly as claimed in claim 4, characterized in that said annular lips define an annular cavity, and in that said assembly comprises a passage connecting said annular cavity to the outside.

19. An assembly as claimed in claim 5, characterized in that said annular lips define an annular cavity, and in that said assembly comprises a passage connecting said annular cavity to the outside.

20. A lip seal assembly for interposing between two cavities containing different fluids, said lip seal assembly comprising:

first and second sealing rings, said sealing rings each having an axis;

first and second annular lips disposed respectively on said first and second sealing rings; and first and second recesses and first and second projections; said first recess and said first projection disposed on said first sealing ring; said second recess and said second projection disposed on said second sealing ring; said projections having a first complementary lateral surface angled radially away from a base of said projection as said first complementary surface axially projects from said sealing ring, said recesses having a second complementary surface angled radially away from an opening as said second complementary surface extends axially from said opening, whereby insertion of said projections into respective recesses and engagement of said first and second complementary surfaces forms a snap-on connection preventing axial separation of said first and second sealing rings and coaxially positioning said first and second sealing rings; said recesses and projections positioned on said first and second sealing rings for mutual engagement, said first and second sealing rings being coaxially secured together by said engagement of said recesses and said projections.

21. The lip seal assembly of claim 20 wherein each of said sealing rings further comprises a plurality of axially projecting spacers, each spacer of one of said sealing rings being positioned to contact a corresponding spacer of the other of said sealing rings.

* * * * *